July 16, 1957     E. A. GONZALES     2,799,113
FISHING LURE

Filed June 4, 1954

INVENTOR.
*Edward A. Gonzales*
BY
*Patrick D. Beavers*
ATTORNEY.

2,799,113

FISHING LURE

Edward A. Gonzales, Denver, Colo.

Application June 4, 1954, Serial No. 434,498

1 Claim. (Cl. 43—42.18)

This invention relates to improvements in artificial fishing lures and has for its primary object to provide a lure which has greater animation and liveliness, due to a two-piece jointed body construction, and which possesses, due to such construction, a flexible body movement while, at the same time, simulating the natural swimming action of a fish when pulled through the water.

Another object of this invention is to provide a two-piece jointed body construction which includes two companion sections that are axially arranged in tandem and disposed in planes perpendicular to each other, thereby rendering the body visible from any direction and also imparting two distinct and separate motions to the body which will give it a flexible movement.

A further object of this invention is to provide an inexpensive and extremely effective lure which includes the two axially aligned sections disposed in planes normal to each other and which includes a strong, reinforced joint between the sections, such joint being formed without using any additional parts and being formed by an interlocking action between the adjoining ends of the sections.

The above and ancillary objects are attained by this invention, the best known forms of which are set forth in the following description and illustrated in the accompanying drawing, wherein.

Figure 1:
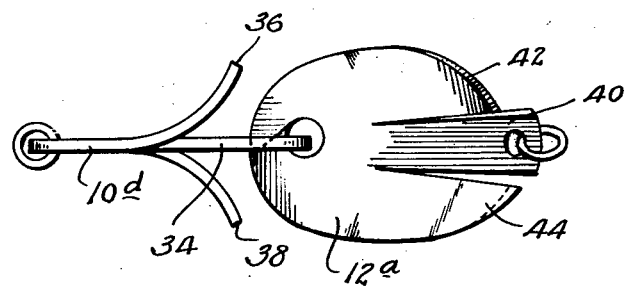
Figure 1 is a side elevational view of the assembled lure.
Figure 2:
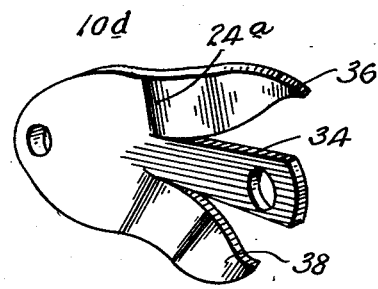
Figure 2 is a perspective view of one member of the lure.
Figure 3:
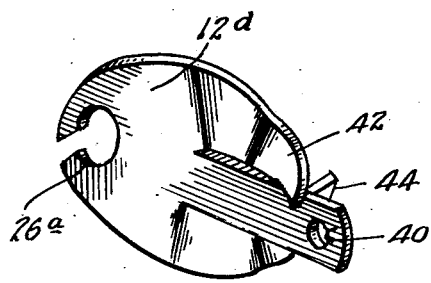
Figure 3 is a perspective view of the companion member, related to the member shown in Figure 2.

The drawings disclose sections 10d and 12d and these are flat. The end 24a of the section 10d is formed in a fish tail formation. The end 24a includes a center section 34 which is flat and extends along the longitudinal center of the section. Fins 36 and 38 extend longitudinally from the front of the section 10d and are disposed along the sides of the center section 34. The fins are bent or curved in opposite directions and extend above and below the center section 34. The section 12d is formed with the slit end 26a and has a flat trailing center section 40. Fins 42 and 44 extend longitudinally rearwardly from the front of the section 12d and are bent in opposite directions along the sides of the center section 40 and extend laterally of the center section 40. Thus, the fins or deflectors of the one section are angled or curved in opposite directions to the fins of the other section, which construction will prevent the lure from completely rotating about its own axis.

It is to be noted that all of the forms include axially aligned end to end related body sections which are disposed in planes perpendicular to each other and that the adjoining ends of the sections are connected by the simple, strong joint construction.

In use, the lures will have a flexible body movement while simulating a natural fish-like swimming in being pulled through the water. The body sections will impart, due to their planar relation, two distinct and separate motions to the lure and will render the lure visible from any direction.

While the best known forms of this invention have been shown in the drawing and described herein, other forms may be realized within the purview of the appended claim.

I claim:

A fishing lure comprising two body sections loosely linked in end to end relationship, each of the sections comprising a flat center portion and rearwardly and laterally directed fin portions, the said fin portions being bent or curved in opposite directions with regard to the center portions, and the fin portions of the rear body section being bent in opposite directions to that of the front sections, the flat sections being so linked that the flat portion of the first section is maintained in a plane generally perpendicular to the flat portion of the other section, the linkage being such that the posterior section will counter the rotating tendency of the anterior section and impart a general wiggling movement to the lure.

References Cited in the file of this patent

UNITED STATES PATENTS

| | | |
|---|---|---|
| 396,404 | Kelley | Jan. 22, 1889 |
| 1,297,617 | Welles | Mar. 18, 1919 |
| 1,620,972 | Hobbs | Mar. 15, 1927 |
| 1,893,390 | Benzick et al. | Jan. 3, 1933 |
| 1,994,678 | Yarvise | Mar. 19, 1935 |
| 2,037,310 | Bryan | Apr. 14, 1936 |
| 2,043,001 | Lambrecht | June 2, 1936 |
| 2,123,150 | Larson et al. | July 5, 1938 |

FOREIGN PATENTS

| | | |
|---|---|---|
| 486,273 | Canada | Sept. 9, 1952 |